(12) United States Patent
Tayama

(10) Patent No.: US 8,233,162 B2
(45) Date of Patent: Jul. 31, 2012

(54) PRINTER CONTROLLER AND METHOD OF PRINTING PRINT DOCUMENT WHICH SCALE DOWN A PRINT IMAGE SO THAT AN ENTIRE AREA OF A PRINT SHEET FITS INTO A PRINTABLE AREA

(75) Inventor: Katsumi Tayama, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 1155 days.

(21) Appl. No.: 12/080,282

(22) Filed: Apr. 2, 2008

(65) Prior Publication Data
US 2008/0186516 A1 Aug. 7, 2008

(30) Foreign Application Priority Data

Apr. 2, 2007 (JP) ................................. 2007-096178
Mar. 6, 2008 (JP) ................................. 2008-055837

(51) Int. Cl.
*G06F 15/00* (2006.01)
*G06F 3/12* (2006.01)
*G06K 1/00* (2006.01)
*G06K 15/02* (2006.01)

(52) U.S. Cl. ........................................ 358/1.13; 358/1.2
(58) Field of Classification Search ............... 358/1.3, 358/1.13, 1.2, 1.9, 1.1
See application file for complete search history.

(56) References Cited

U.S. PATENT DOCUMENTS

| | | | | |
|---|---|---|---|---|
| 7,084,995 | B2 * | 8/2006 | Mori et al. | 358/1.15 |
| 7,307,745 | B2 | 12/2007 | Tanaka | |
| 7,612,907 | B2 * | 11/2009 | Kawai et al. | 358/1.18 |
| 2006/0221361 | A1 | 10/2006 | Takagi | |

FOREIGN PATENT DOCUMENTS

| | | |
|---|---|---|
| JP | 2003-216367 | 7/2003 |
| JP | 2006-285870 | 10/2006 |

* cited by examiner

*Primary Examiner* — Douglas Tran
(74) *Attorney, Agent, or Firm* — Nutter McClennen & Fish LLP; John J. Penny, V.

(57) ABSTRACT

A printer controller includes an XPS driver operable to cause a printer to perform printing operation in conformation with XPS standard. The XPS driver includes; a receiver, operable to receive a print document; an analyzer, operable to analyze the print document; a determiner, operable to determine, based on a result of analysis, whether or not the print document includes a print instruction for performing printing outside a printable area on a print sheet; a generator, when a result of determination indicates that the print document includes the print instruction for performing printing outside the printable area, operable to generate a scaled-down print image into which a print image generated in accordance with the print document is scaled down at such a scaling factor at which an entire area of the print sheet fits into the printable area; and an outputter, operable to output data of the scaled-down print image to the printer.

5 Claims, 4 Drawing Sheets

PRINTER CONTROLLER AND METHOD OF PRINTING PRINT DOCUMENT WHICH SCALE DOWN A PRINT IMAGE SO THAT AN ENTIRE AREA OF A PRINT SHEET FITS INTO A PRINTABLE AREA

BACKGROUND

1. Technical Field

The present invention relates to a print technique using an XPS driver, and more particularly to a technique for appropriately performing printing operation in response to a print request from a GDI application.

2. Related Art

In relation to Windows XP (Trademark or Registered Trademark) of Microsoft Corporation, standards called a GDI (Graphic Device Interface) for controlling a printer and a display are available.

In the meantime, in relation to Windows Vista (Trademark or Registered Trademark) of Microsoft Corporation, standards called an XPS (XML Paper Specification) are adopted.

Incidentally, JP-A-2007-249854 includes descriptions about (1) a flow of print processing from a Win32 application to a GDI driver; (2) a flow of print processing from a WinFX application to an XPS printer driver; (3) a flow of print processing from the Win32 application to the XPS printer driver; and (4) a flow of print processing from the WinFX application to the GDI driver. JP-A-2007-249854 is not yet open to the public at the time of the filing date (Apr. 2, 2007) of the application basic to the present patent application.

In order to grasp a printable area R2 (see FIG. 2) of a print sheet, the GDI application that performs output processing by means of a GDI issues a GetDeviceCaps( ) function to a printer driver complying with the GDI (hereinafter called a "GDI driver"), to thus acquire the size of the printable area R2.

In contrast, the XPS driver that is a printer driver complying with the XPS standards is arranged so as to return the size of a print sheet area R1 to the GetDeviceCaps( ) function. Specifically, a related-art GDI application not conforming to the standards issues a GetDeviceCaps( ) function and comprehends, upon receipt of the size from the XPS driver, that the entire area R1 of the print sheet shown in FIG. 2 is printable (although an actual printable area is R2).

Therefore, the GDI application issues, to the XPS driver, a print request for assigning a print image to the area that lies off the actual printable area R2. If the XPS driver causes the printer to perform printing without modifications in response to the print request, an image assigned to an area of a margin M (an area difference between the print sheet area R1 and the printable area R2) will not be printed.

SUMMARY

An advantage of some aspects of the invention is to provide a printer controller which is capable of printing, when printing responsive to a print request issued by a GDI application is performed by use of an XPS driver, information to be printed within a printable area while preventing the information to be printed from lying off the printable area.

According to an aspect of the invention, there is provided a printer controller, comprising an XPS driver operable to cause a printer to perform printing operation in conformation with XPS standard, wherein
the XPS driver includes:
a receiver, operable to receive a print document;
an analyzer, operable to analyze the print document;
a determiner, operable to determine, based on a result of analysis, whether or not the print document includes a print instruction for performing printing outside a printable area on a print sheet;
a generator, when a result of determination indicates that the print document includes the print instruction for performing printing outside the printable area, operable to generate a scaled-down print image into which a print image generated in accordance with the print document is scaled down at such a scaling factor at which an entire area of the print sheet fits into the printable area; and
an outputter, operable to output data of the scaled-down print image to the printer.

The present disclosure relates to the subject matter contained in Japanese patent application Nos. 2007-096178 filed on Apr. 2, 2007 and 2008-055837 filed on Mar. 8, 2008, which are expressly incorporated herein by reference in its entirety.

BRIEF DESCRIPTION OF THE DRAWINGS

The invention will be described with reference to the accompanying drawings, wherein like numbers reference like elements.

DESCRIPTION OF EXEMPLARY EMBODIMENTS

A print system of an embodiment of the present invention will be described hereunder by reference to the drawings.

Figure 1:
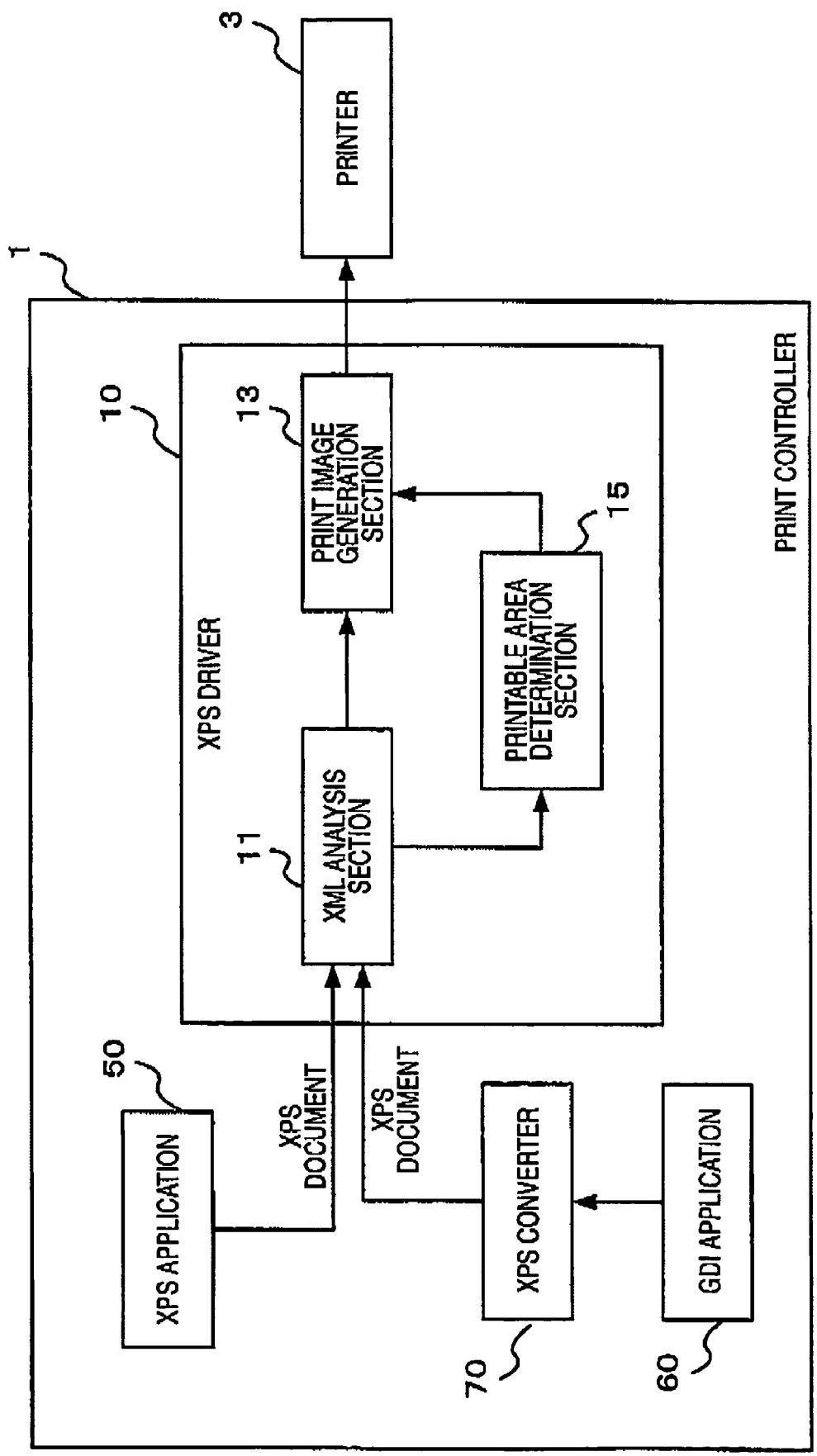
FIG. 1 is a block diagram of a print system of an embodiment of the present invention.

FIG. 1 shows a block diagram of a print system of the embodiment of the present invention. As illustrated, the system includes a print controller 1 and a printer 3.

The print controller 1 is made up of, for example, a general-purpose computer system. Individual constituent elements or functions in the print controller 1, which will be described below, are implemented by executing, for example, a computer program.

The print controller 1 includes an XPS driver 10, XPS application software (hereinafter called an "XPS application") 50, GDI application software (hereinafter called an "GDI application") 60, and an XPS converter 70.

The XPS application 50 is application software that generates an XPS document described in XML and that outputs the thus-generated document. For instance, when a print request is sent to the XPS driver 10, contents to be printed are output in the form of an XPS document.

The GDI application 60 outputs a print request conforming to a related-art GDI. Specifically, the GDI application 60 generates a print request by assigning an image to be printed within an area acquired by means of the GetDeviceCaps( ) function.

The XPS converter 70 converts the print request output by the GDI application 60 by use of the GDI into an XPS document.

Upon receipt of a call for the GetDeviceCaps( ) function from the XPS application 50 or the GDI application 60, the XPS driver 10 returns the size of a print sheet. Further, the XPS driver 10 includes an XML analysis section 11 that receives an XPS document and that analyzes an XML statement included in the XPS document, a print image generation section 13 that performs expansion of the XML statement into a print image in accordance with the XPS document, and a printable area determination section 15.

The XML analysis section 11 receives an XPS document prepared by the XPS application 50 or into which the XPS converter 70 converts an output from the GDI application 60. The XML analysis section 11 reads an XML statement from the received XPS document, to thus analyze an XML. For instance, in the XPS document, the size of a print sheet, specifics and positional coordinates of a plurality of rendering elements, and the like, are specified by means of XML statements. The XML analysis section 11 interprets the XML statement in connection with the respective rendering elements. The rendering elements designate objects to be printed, for instance, letters, images, or line drawings.

The printable area determination section 15 determines whether or not the respective rendering elements described in the XPS document fit into a printable area of the printer.

Figure 2:
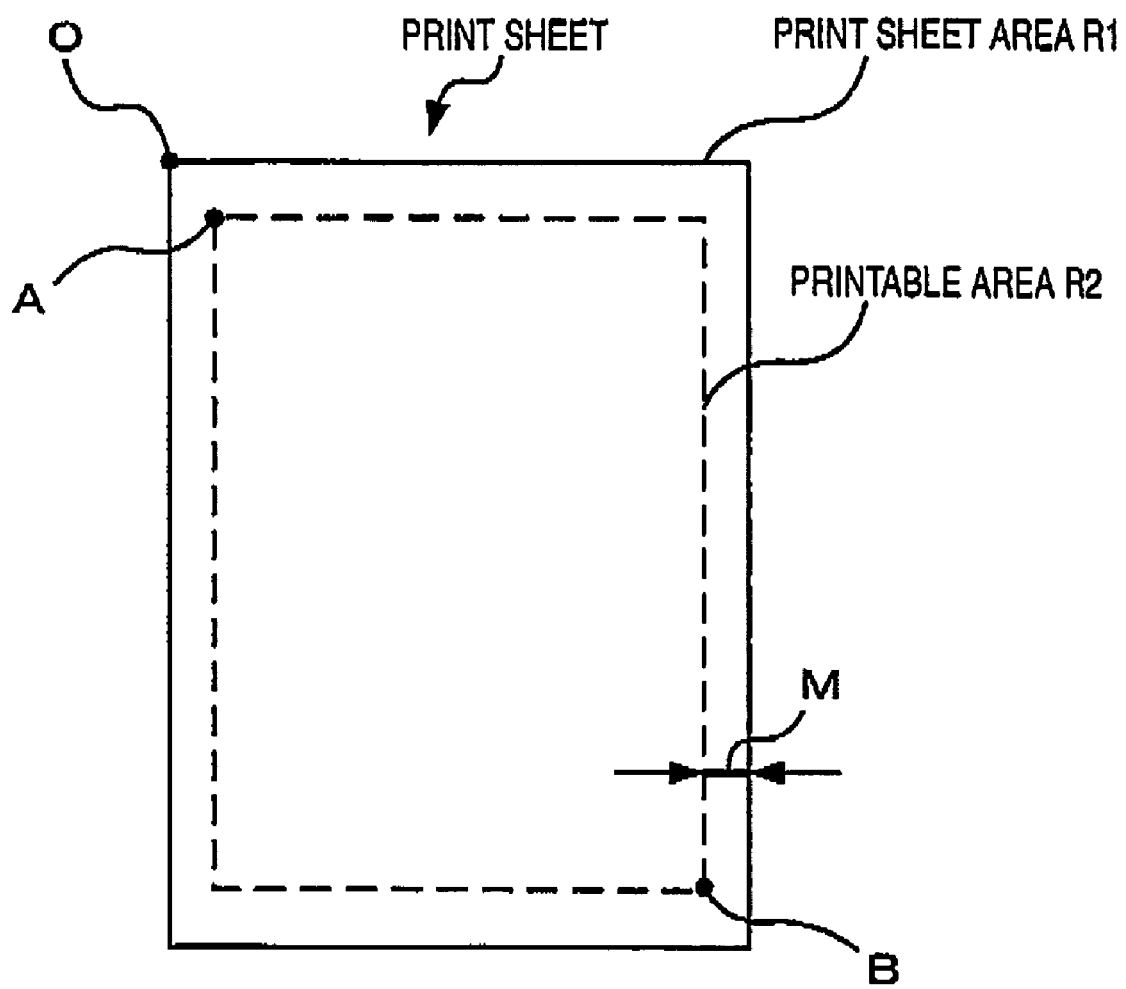
FIG. 2 shows a print sheet area and a printable area.

FIG. 2 shows a print sheet area and a printable area.

A print sheet area R1 showing an overall print sheet is determined in accordance with the size of a print sheet. Further, a margin M where the printer cannot perform printing is present in each of print sheet sizes. An area located inside of the margin M is a printable area R2. For instance, when reference symbol O in the drawing is taken as a point of origin, the printable area R2 is specified by X-Y coordinates of A and B.

In accordance with a result of analysis performed by the XML analysis section 11, the printable area determination section 15 determines whether or not rendering elements lying off the printable area R2 are present. For instance, such a determination is made by means of determining whether or not coordinates of positions to which the rendering elements are assigned fall within an area defined by the X-Y coordinates of A and B belonging to the range of the printable area R2.

The print image generation section 13 expands rendering elements in accordance with the result of analysis performed by the XML analysis section 11, thereby generating a print image to be printed. For instance, the print image generation section 13 assigns rendering elements, such as characters, images, or line drawings, to rendering positions of the respective rendering elements analyzed by the XML analysis section 11, thereby generating a print image.

When the printable area determination section 15 determines that rendering elements lying off the printable area R2 are present, the print image generation section 13 generates a scaled-down print image. For example, the print image generation section 13 may scale down the entirety of a print image at a predetermined scaling-down factor after generating the print image resultant from direct expansion of an XML statement of an XPS document or may generate a scaled-down print image in consideration of a scaling-down factor when expanding an XML statement of the XPS document. The scaling-down factor is a factor for performing scaling-down operation such that the range of the print sheet area R1 fits into the printable area R2. The scaling-down factor is set for each sheet size and previously held in the printable area determination section 15.

Figure 3:
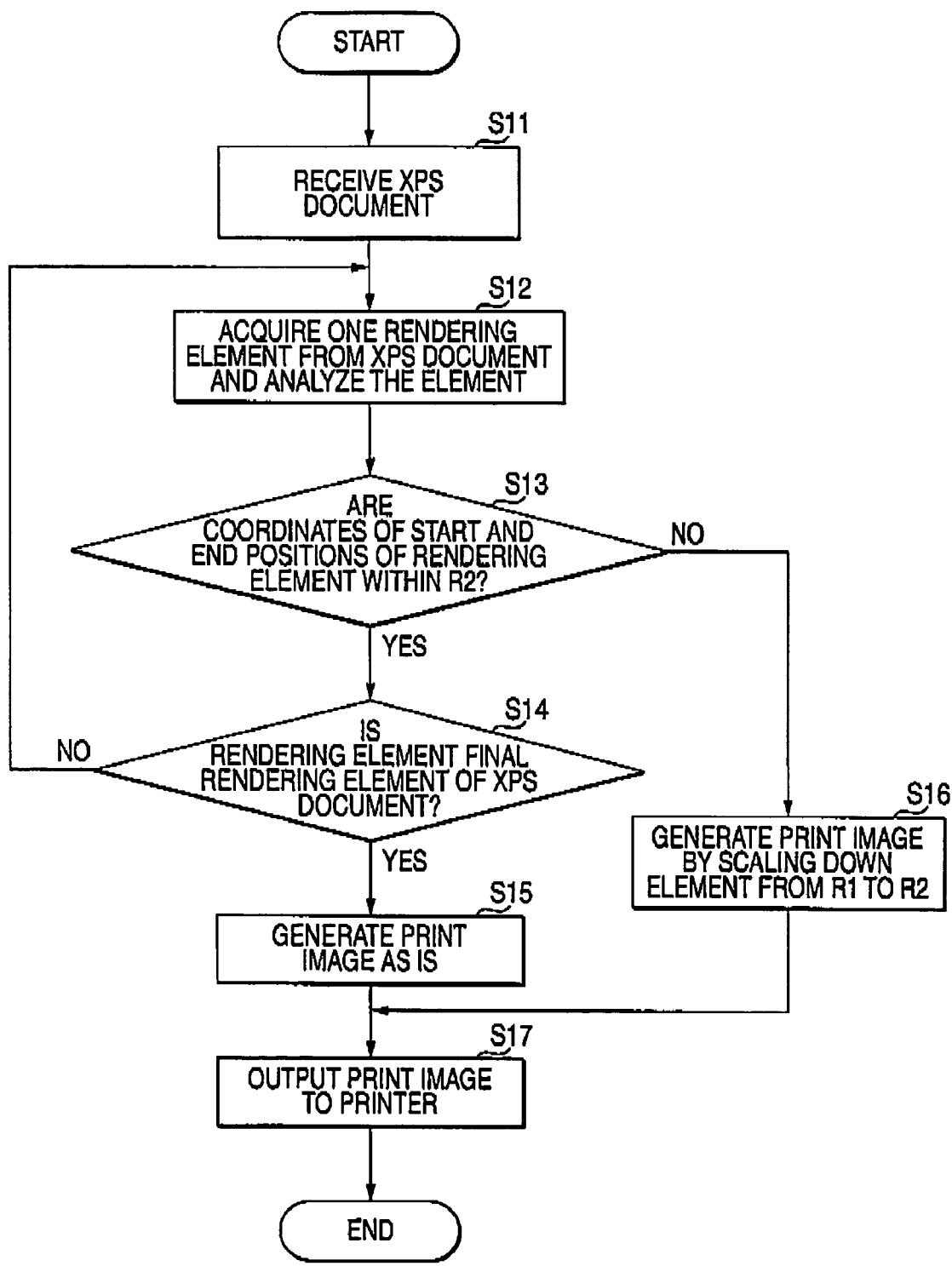
FIG. 3 is a flowchart showing processing procedures employed when printing is performed.

FIG. 3 is a flowchart showing processing procedures employed when the print system having the foregoing configuration performs printing operation.

First, the XML analysis section 11 receives an XPS document (S11). The XML analysis section 11 acquires an XML statement about one rendering element from the thus-received XPS document and analyzes rendering positions of rendering elements in the XML statement (S12). The printable area determination section 15 determines, on the basis of the result of analysis performed by the XML analysis section 11, whether or not coordinates of rendering start position and rendering end position of the rendering element fall within the printable area R2 (S13).

If the rendering element lies outside the printable area R2 (S13; No), the print image generation section 13 interprets XML statements of all rendering elements of the XPS document and generates a scaled-down print image that is a result of scaling down of a print image complying with the XML statements (S16).

In the meantime, if the rendering element falls within the printable area R2 (S13: Yes), a determination is made as to whether or not the rendering element is the final rendering element among the rendering elements described in the XPS document (S14). When the rendering element is not the final rendering element (S14: No), processing pertaining to step S12 and subsequent steps is repeated with respect to all of the rendering elements.

If all of the rendering elements fit in the printable area R2 (S14: Yes), the print image generation section 13 interprets the XML statements of all of the rendering elements of the XPS document and generates a print image complying with the XML statements (S15).

The image generated by the print image generation section 13 is output to the printer 3, where printing is performed (S17).

The XPS driver 10 may determine whether or not the received XPS document is sent from the XPS application 50 or from the XPS converter 70. This can be decided by means of, for example, an "hdc" parameter of the DrvDocumentEvent( ) function. Specifically, the XPS document can be determined to be sent directly from the XPS application 50 or by way of the XPS converter 70 by means of a result of determination as to whether or not the "hdc" parameter is "INVALID_HANDLE_VALUE." Therefore, when determined that an originator of the print document is the XPS application 50, the XPS driver 10 may interpret XML statements of a received XPS document without making determinations pertaining to steps S12 to S14 at the time of processing of the received XPS document, and may generate a print image of an original size without performing scaling-down operation.

Next, example printing of the embodiment shown in FIGS. 4A and 4B will be described.

Figure 4A:
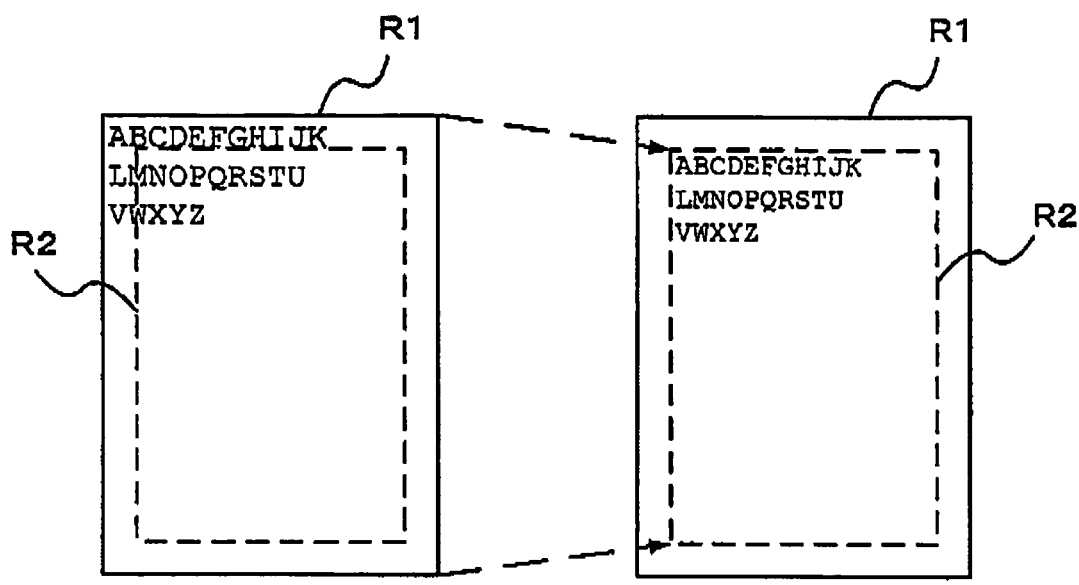
FIGS. 4A and 4B show examples for printing of the embodiment.

There is a case where information, such as characters to be printed, lies off the printable area R2 as shown in, for example, the left side of FIG. 4A, in an XPS document generated by the XPS converter 70 from an output of the GDI application 60. At this time, according to the foregoing embodiment, a scaled-down print image (the right side of FIG. 4A) for which the print sheet area R1 is scaled down to the printable area R2 is generated. As a result, all of the rendering elements are printed while fitting into the printable area R2.

Figure 4B:
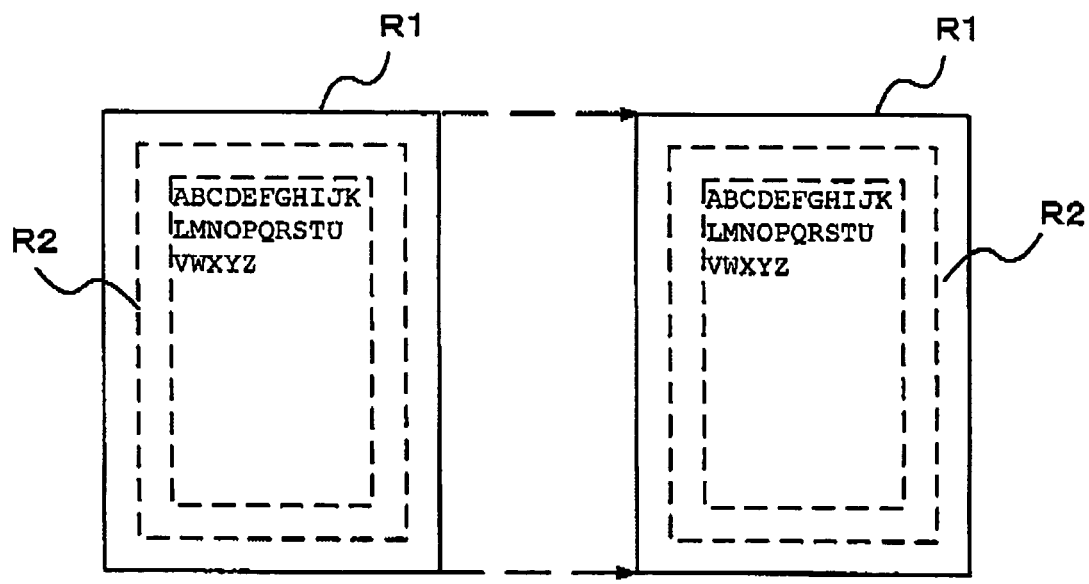

In the meantime, as in the case of the XPS document that is shown in the left side of FIG. 4B and that is generated by the XPS application 50 and the XPS document that is generated by the XPS converter 70 in accordance with a print request whose margin is appropriately set by the GDI application 60, when information, such as letters to be printed, does not lie off the printable area R2, printing is performed as is without involvement of scaling-down operation as shown in the right side of FIG. 4B.

Consequently, in the print system of the present embodiment, printing can be performed appropriately even in the case of a print request from the related-art GDI application.

The previously-described embodiments of the present invention are illustrations for describing the present invention and are not intended for limiting the scope of the present invention solely to the embodiments. Those who are versed in the art can practice the present invention in various modes without departing from the spirit of the present invention.

What is claimed is:

1. A printer controller, comprising an XPS driver operable to cause a printer to perform printing operation in conformation with XPS standard, wherein the XPS driver includes; a receiver, operable to receive a print document; an analyzer, operable to analyze the print document; a determiner, operable to determine, based on a result of analysis, whether or not the print document includes a print instruction for performing printing outside a printable area on a print sheet; a generator, when a result of determination indicates that the print document includes the print instruction for performing printing outside the printable area, operable to generate a scaled-down print image into which a print image generated in accordance with the print document is scaled down at such a scaling factor at which an entire area of the print sheet fits into the printable area; and an outputter, operable to output data of the scaled-down print image to the printer.

2. The printer controller according to claim 1, further comprising: a GDI application, operable to issue a print request by use of a GDI; and a converter, operable to convert the print request issued by the GDI application into the print document.

3. The print controller according to claim 1, further comprising: a decider, operable to decide whether or not an originator of the print document conforms to the XPS standard, wherein, when the originator is decided to conform to the XPS standard, printing is performed without performing the determination and generating the scaled-down print image.

4. A method of causing a printer to perform printing operation in conformance with XPS standard, the method comprising: receiving a print document; analyzing the print document; determining, based on a result of analysis, whether or not the print document includes a print instruction for performing printing outside a printable area on a print sheet; when a result of determination shows that the print document includes the print instruction for performing printing outside the printable area, generating a scaled-down print image into which a print image generated in accordance with the print document is scaled down at such a scaling factor at which an entire area of the print sheet fits into the printable area; and outputting to the printer data of the scaled-down print image.

5. A non-transitory computer-readable recording medium in which a computer program causing a computer to execute the method according to claim 4 is recorded.

* * * * *